United States Patent [19]

Lynch

[11] Patent Number: 6,138,989
[45] Date of Patent: Oct. 31, 2000

[54] APPARATUS AND PROCESS FOR REPAIR OF LARGE BUTTERFLY VALVES

[75] Inventor: C. Thomas Lynch, Berkeley, Calif.

[73] Assignee: Site Constructors, Inc., Chico, Calif.

[21] Appl. No.: 09/313,960

[22] Filed: May 18, 1999

[51] Int. Cl.[7] .............................. F16K 1/22; F16J 15/02
[52] U.S. Cl. ......................... 251/306; 277/630; 277/637; 277/644
[58] Field of Search .................................. 251/175, 306, 251/307; 277/630, 637, 644, 619

[56] References Cited

U.S. PATENT DOCUMENTS

| | | | |
|---|---|---|---|
| 2,853,267 | 9/1958 | Herren et al. | 251/175 |
| 3,144,040 | 8/1964 | White | 137/315 |
| 4,082,246 | 4/1978 | Rothwell | 251/307 |
| 4,239,124 | 12/1980 | Inouye | 227/190 |
| 5,575,487 | 11/1996 | Balsells | 277/169 |

*Primary Examiner*—Kevin Shaver
*Assistant Examiner*—D A Bonderer
*Attorney, Agent, or Firm*—Townsend and Townsend and Crew LLP

[57] ABSTRACT

A repair of a butterfly valve having metal seat includes de-watering of the valve, and movement of the disc to the open position. As in the prior art, the extant (usually brass) valve seat is machine in situ and capped with a stainless steel substitute seat having relatively low slope in the range of 10° to 20° with respect to the closing valve disc. The valve disc edge and valve disc edge caps are removed. A new valve flap seal clamp and relatively hard rubber seal (in the range of 70±5 shore) is inserted. The new valve seal edge clamp has a profile to completely capture the inserted rubber valve seal edge and assure that all elastic extrusion occurs only to and toward the refurbished valve seat. This elastic extrusion necks down and decreases in cross-section toward the edge of the disc of the valve. When the clamp is compressed, the elastic section of the rubber valve seal is extruded to extend to and toward the valve seat. This extension by extrusion occurs along an axis, which axis is at an obtuse angle with respect to the refurbished seat on the high-pressure side of the valve disc.

6 Claims, 5 Drawing Sheets

APPARATUS AND PROCESS FOR REPAIR OF LARGE BUTTERFLY VALVES

This invention relates to the repair of large butterfly valves. More specifically, an apparatus and process is disclosed in which metal seats and metal flap edges (usually made of brass) are replaced with a combination of a stainless steel valve seat and a compressed rubber flap edge to provide a new and improved seal.

BACKGROUND OF THE INVENTION

I have effected the repair of a 12-foot diameter butterfly valve having a brass seat and a brass disc edge. This valve resided in a hydroelectric facility of the Tennessee Valley Authority (TVA) and operated at what I considered to be a relatively low pressure—under 150 psi. This one repair is relevant prior art of which I am aware that is pertinent to this invention.

In this prior art repair, the following procedures were followed:

First, the valve was de-watered and moved to the open position.

Second, the valve seat attached to the valve body was machined down. A stainless steel seat was placed over the machined down seat and bolted into place. By leaving the old machined down seat in place and bolting either to the machined down portion of the seat, the valve body or both, a repair simplification occurred.

Third, the metal disc edge was removed from the valve disc.

Fourth, a rubber seal was substituted for the removed metal seat.

Finally, the valve was rotated to the closed position. Thereafter, the clamping of the rubber was used to effect excursion of the rubber to come into contact with the newly refurbished valve seat.

This repair worked. However, the reader must understand that this valve operated in what I denominate to be the low-pressure range. Further, the valve was of a dimension that the blue prints of the valve and the actual dimensions of the valve tracked fairly closely.

In what immediately follows, I describe the problem environment of this invention; this invention is applied to large high-pressure valves. In making this description I will set forth-certain difficulties. The reader is to understand that invention can reside in identifying the problem to be solved as well as the solution to the problem, once it is known.

Before describing in detail this improved repair technique, the reader should understand that the valves on which the new repair technique is proposed are extremely large. For example, one valve is 138 inches in diameter or 11 feet 6 inches in diameter. I also should make the point that flap valves in hydroelectric facilities are old and come from a time in engineering practices that are out of step with current accepted techniques and records. For example, most of these valves are at least over 30 years old and many on the order of 40 years old. At the time of construction of these large valves, "blue prints" acted more as a guide than as a rigid design constraint to the valves. As a consequence, when such valves are repaired, reference to the drawings of the valves give the repairing engineer a rough idea of valve dimensions—but that is all. Actual valve dimensions vary widely from prints of record. For example, although the prints often indicate that the valve seats and valve seals are round, they frequently depart from what is the modern definition of the term "round." Therefore, repair techniques must be ready to accommodate unexpected dimensional excursion.

Trying to transfer my valve repair technique to large high-pressure valves left many short-comings.

First, I understood that my prior technique was not suitable pressures in excess of 150 psi. I had to locate a disc edge design with an elastic extrudable seal edge that could be relied upon not to elastically deform and then leak in high-pressure environments, such as 150 to 600 psi.

Second, the clamping of the rubber at the edge of the valve flap of the prior art design was inadequate. Such clamping was not central to the mass of the rubber edge inserted to the valve. As the present design eventually developed, finite element analysis gave the realization that clamping of the newly substituted valve seat would cause a non-symmetrical elastic extrusion of the rubber. This non-symmetrical extrusion of the rubber advanced extruded rubber having bending resistance less than the contained pressure. Such bending resistance less than the contained rubber would lead to leakage in the finished valve.

Third, while it at first seem logical to provide an increased mass of elastically extruded rubber for resistance of high pressure, it turned out that the elastic extrusion of rubber required instead a decreased mass of compressed elastically extruded rubber at the valve seat contacting portion of the flap.

Finally, in the originally fabricated edge of the valve seat, the edge protruded normally outward of the valve seat. As will hereafter become apparent, the extruded edge of the seat has angularity with respect to the seat edge. Specifically, the elastically extruded portion of the disc edge is inclined to and toward the high-pressure portion of the valve disc. This inclination gives the extruded portion of the valve flap an "over center" seating. For the seal produced by this invention to fail, the elastically extruded portion of the valve disc edge must compress with respect to the valve seat. Further, and during such compression with the valve seat, the elastically extruded portion of the valve seat must deform in a manner, which is "over-center." Thus, resistance of leakage at high pressure is enhanced by the disclosure of the disc edge design here set forth.

SUMMARY OF THE INVENTION

A repair of a butterfly valve having metal seat includes de-watering of the valve, and movement of the disc to the open position. As in the prior art, the extant (usually brass) valve seat is machine in situ and capped with a stainless steel substitute seat having relatively low slope in the range of 100 to 200 with respect to the closing valve disc. The valve disc edge and valve disc edge caps are removed. A new valve disc edge clamp and relatively hard rubber seal (in the range of 70±5 shore) is inserted. The new valve disc edge clamp has a profile to completely capture the inserted rubber valve seal edge and assure that all elastic extrusion occurs only to and toward the refurbished valve seat. This elastic extrusion necks down and decreases in cross-section toward the edge of the seal of the valve. When the clamp is compressed, the elastic section of the rubber valve seal is extruded to extend to and toward the valve seat. This extension by extrusion occurs along an axis, which axis is at an obtuse angle with respect to the refurbished seat on the high-pressure side of the valve disc. This elastic extrusion has two features, which resist leakage between the valve disc edge and refurbished seat. First, and before the valve seal edge can be elastically deformed to move beyond the edge of the seat to a position where it can leak, it must be forced under increased pressure onto the valve seat. This forced movement occurs first towards a position of being normal with respect to the valve seat, it being realized that during such movement the pressure of seal edge contact to the seat will increase. Second, because of the decreasing section of the rubber valve seal edge as it is compressed away from the clamp, the rubber of the valve seal edge must be elastically compressed. As both the compression phenomena and the over center phenomena resist high-pressure leakage of the elastically extruded valve edge seal with respect to the refurbished seat, a seal valve edge repair having resistance to high pressures in the range of 150 to 600 psi results.

In the normal case, size does not matter in assessing patentability. The reader will appreciate that here size is a major consideration. Specifically, given the large area of the valve disc, and the use of a substituted rubber seal edge for the originally designed valve seal edge, careful selection of edge design is required to prevent elastic deformation with subsequent leakage at the valve seal edge.

DESCRIPTION OF THE SPECIFIC EMBODIMENTS

Figure 1A:
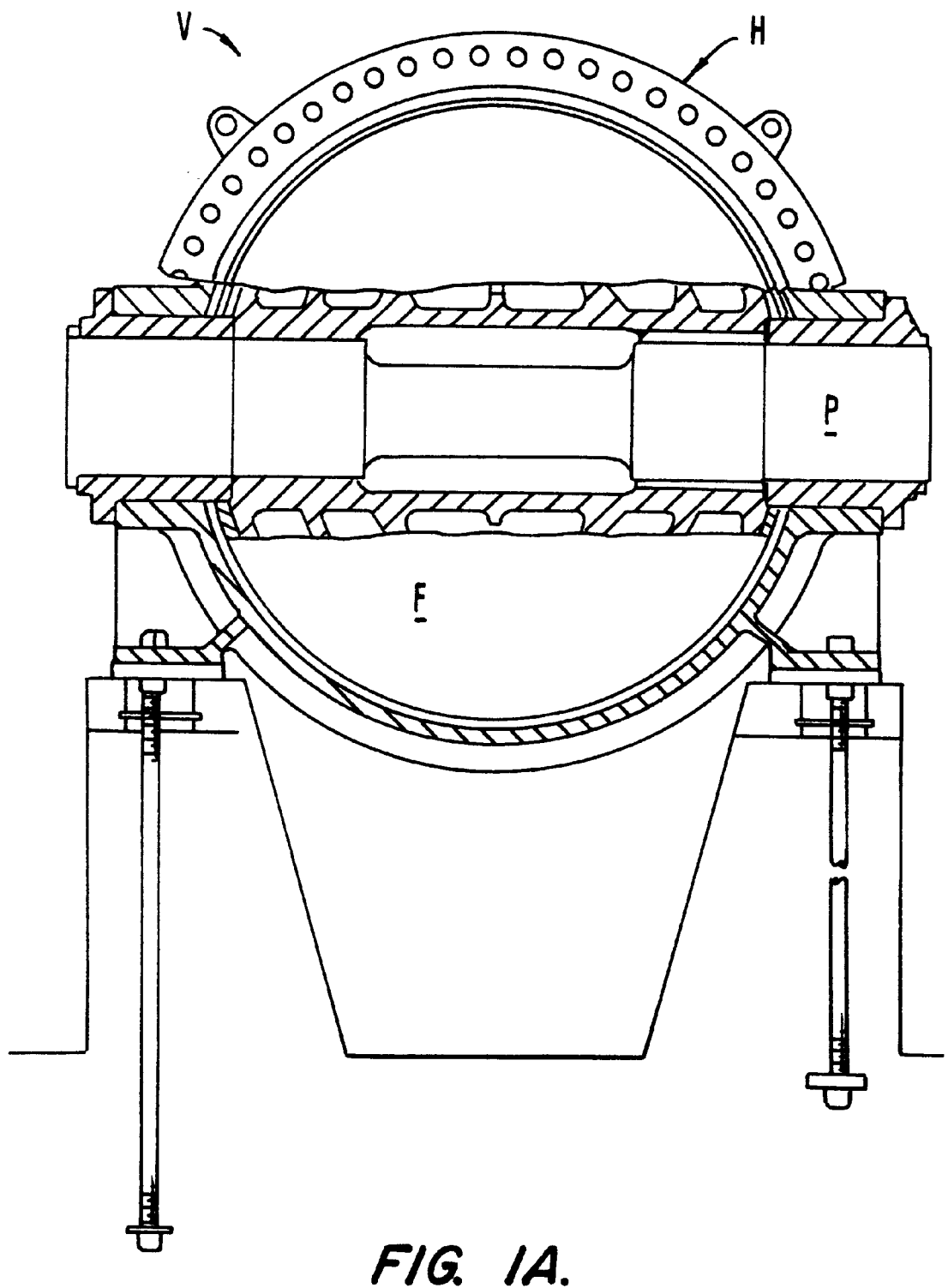
FIG. 1A and 1B are respectively a front and side elevations of prior art valve to be repaired using the invention of this apparatus.

Referring to FIG. 1A, a prior butterfly flap valve V, which is to be repaired is shown in front elevation section. Valve housing H is shown with pivot P extending across valve housing H. Pivot P has valve seal F attached.

Figure 1B:
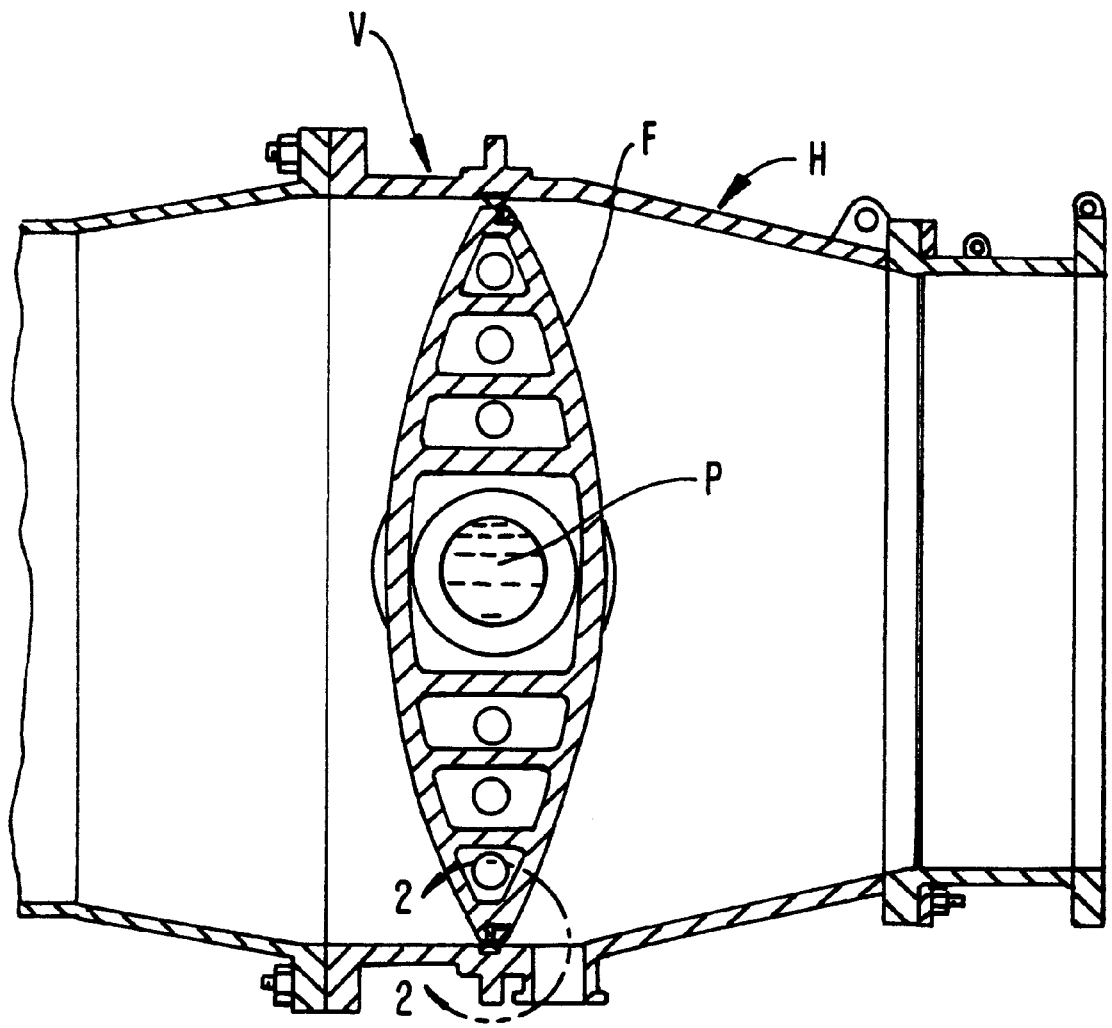
Figure 2:
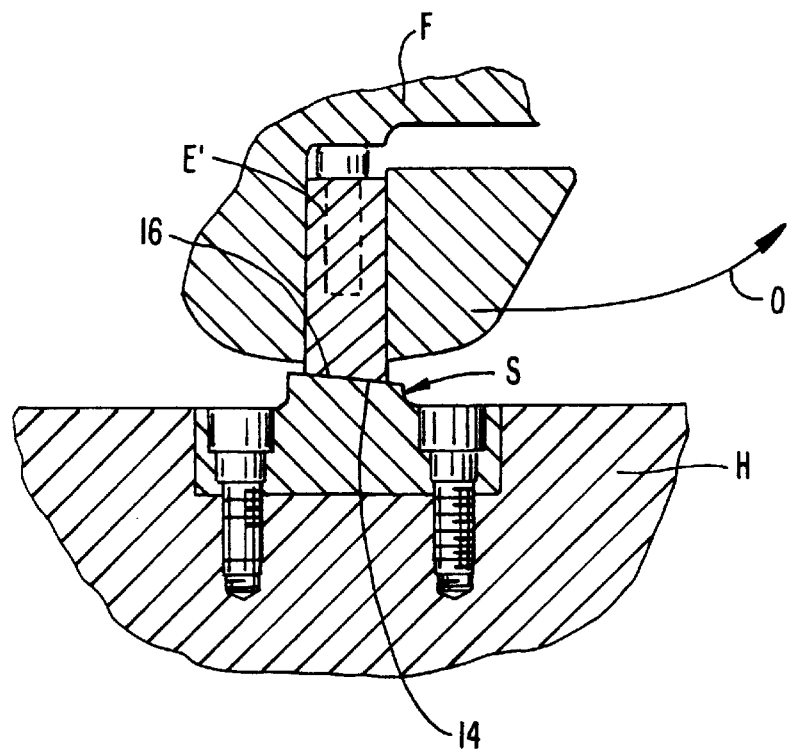
FIG. 2 is a section along lines 2—2 of FIG. 1 illustrating the configuration of the prior art valve seat which is usually constructed of brass.

Referring to FIG. 1B, valve disc F is shown in the closed position with valve disc F pivoted to extend across valve body H. In this disposition, and as shown in FIG. 2 in the original design, seat S mated with valve seal edge E'. Specifically, seat edge slope 16 is imparted an angularity with respect valve seat edge slope 14. When valve disc F turns on trunnion P with valve seal edge E' moving in the direction of opening O, opening of butterfly valve V occurred. Conversely, when valve disc F turns on trunnion P with valve seal edge E' moving against the direction of opening O, closing of butterfly valve V occurs.

At this point two comments need to be made. First, this particular butterfly valve V is huge. It is 11 feet 6 inches in diameter. Second, this valve is a survivor from a different era. Specifically, butterfly valve V was made by the Baldwin, Lima, Hamilton Company, the famous maker of locomotives and other heavy machinery. Manufacture of this valve occurred around 1967. In such valves, seat S and valve seal edge E' were made of brass. Most importantly, such valves were essentially fitted for closure by hand. In actual fact, the "blue prints" of such valves are merely guides as to what one might expect in the field. Further, time, and installation sites have caused such valves to change configuration. Further, just a moments reflection will leave the reader with the impression that such valves are simply too large to move. They are frequently placed at their sites in such a way that movement is either not practical or impossible.

After about forty years of service, seat S at seat edge slope 16 and valve seal edge E' at valve flap edge slope 14 start to leak. Further, the reader will remember that the repair which is the subject of this disclosure is aimed at pressures between 150 psi and 600 psi. At these high pressures, small discrepancies in seat S and valve seal edge E' cause large quantities of water to leak through flap valve V.

The location of these-flap valves V is typically upstream of turbines. Butterfly valve V are only occasionally shut for turbine repair. And where large volumes of water leak upon valve closure, turbine repair is impossible.

There is an additional constraint in which the repair of butterfly valve V resides. With large turbines, the time such turbines are off lines correlates to revenue loss. And where the butterfly valve V upstream of the turbine is being repaired, the entire system for providing water to the turbine must be de-watered. This being the case, time is of the essence. Clearly a repair procedure must be adopted which is fast and reliable.

Having said this much, attention will now be devoted to the prior art aspects of this repair.

First, butterfly valve V is de-watered and has valve disc F on trunnion P moved to the open position.

Figure 4:
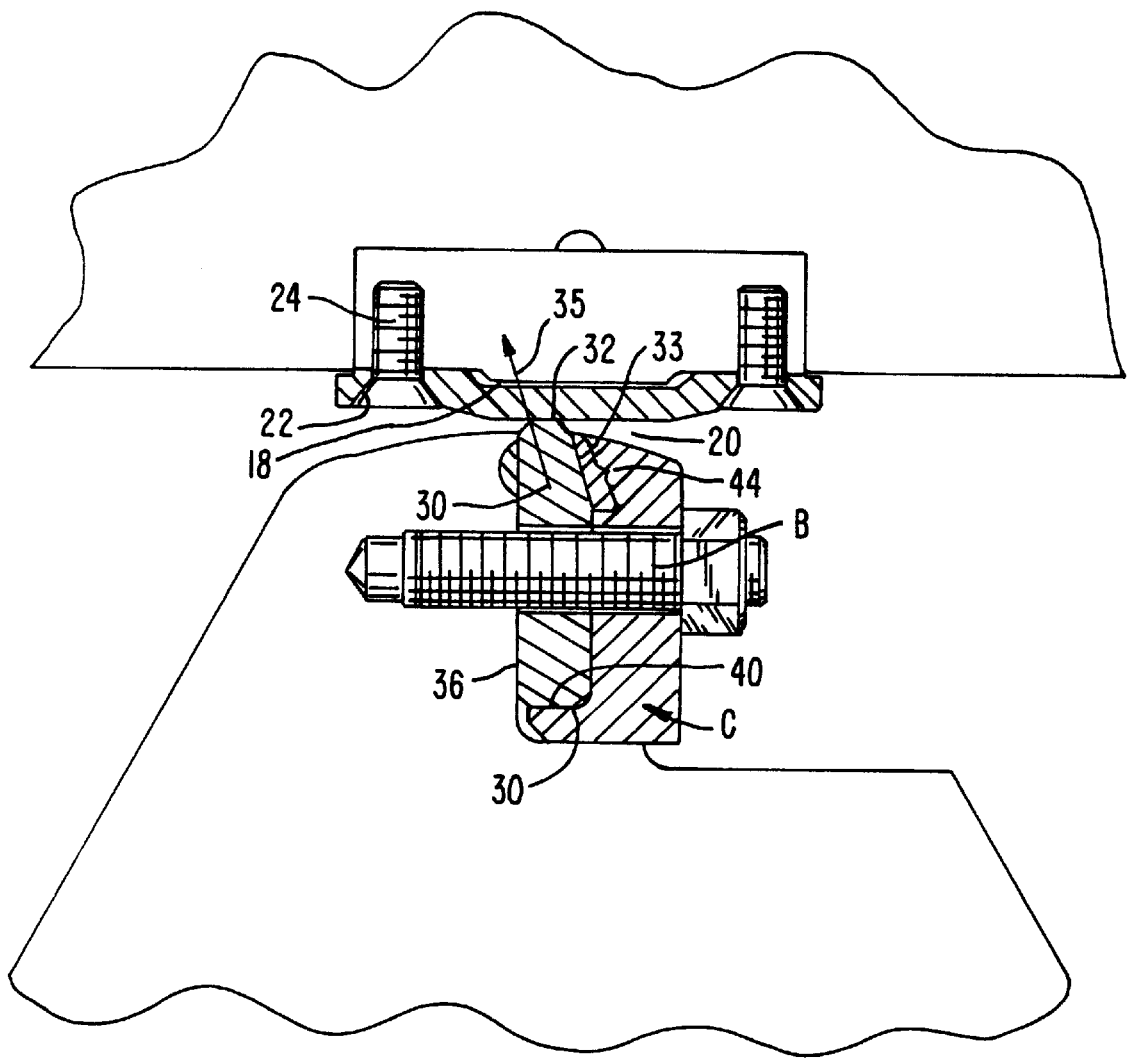
FIG. 4 is a side elevation section of the elastically extruded seal edge juxtaposed to the valve seat illustrating the required movement necessary for first over-center movement of the valve seal edge followed by leakage of the valve; and, FIG. 5 is a front elevation of the clamp sections installed to the valve disc edge with metal keepers bent to prevent clamp bolt rotation.

Second, and with reference to prior art FIG. 2 and FIG. 4, brass seat S is machined down to seat profile 18 shown in FIG. 4. Thereafter, stainless steel seat surface is introduced over the top of seat S. Fastening occurs directly to the remaining metal of seat S and even into valve housing H of stainless steel seat surface 20 by countersunk bolt apertures 22 held by countersunk bolts 24.

It will be understood that stainless steel seat surface 20 is provided with a beveled surface. This surface is angled from 20 degrees adjacent the edges to 10 degrees adjacent the center. Further, stainless steel seat surface 20 is designed to be reversible. That is to say, valve flap edge E can approach stainless steel seat surface 20 from either direction and effect a seal.

Stopping at this juncture, this is the end of the prior art. In what follows, I describe the new functions of this disclosure.

Figure 3:
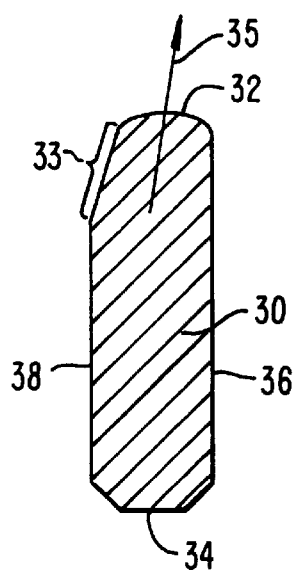
FIG. 3 is a side elevation section of the uncompressed elastic edge according to this invention.

Referring to FIG. 3, elastic flap edge 30 is shown in an elastically uncompressed and unextruded shape. This member is made from hard rubber in the range of 70±5 shore. Such rubber can be obtained from the American Rubber Company of Walnut Creek, Calif. under the designation V173072 Acrylonitrile Butadiene NBR Shore A 70±5.

Several observations can be made about elastic seal edge 30. First it has rounded edge 32. Rounded edge 32 forms the seating surface on the edge of valve seat F.

Second, it will be seen that elastic seal edge 30 is provided with beveled section 33 adjacent rounded edge 32, beveled section 33 is only on one side of elastic seal edge 30. As will later become apparent, this provides for elastic compression and extrusion along angled vector 35 when clamping occurs.

Third, it is required that elastic extrusion occur away from valve disc F and 20 toward seat S. This being the case, inner rubber surface 34 must be limited in its ability to elastically extrude away from the edge of valve disc F.

Fourth, elastic compression and extrusion occurs between high pressure surface side 36 and low pressure and beveled surface side 38. It is also to be understood that beveled section 33 is equally compressed due to the shape of the introduced clamp.

Some important statements can be made about rounded edge 32 and angled vector 35. Angled vector 35 is the bisected angle of beveled section 33 and high pressure surface side 36. It is inclined about 10 degrees from the plane of valve disc F.

Thus, and when elastically compressed and elastically extruded by a clamp, elastic seal edge 30 expands rounded edge 32 in the direction of angled vector 35.

Further, the rubber of elastic seal edge 30 is elastically compressed and elastically extruded at rounded edge 32. Thus, the compression makes elastic flap edge 30 at rounded edge 32 harder. Although the total available cross-section of elastic seal edge 30 decreases, the elastic compression and elastic extrusion is sufficient to make a seal.

Finally, it will be remembered that high pressure surface side 36 of elastic seal edge 30 encounters considerable hydraulic pressure. This pressure will urge rounded edge 32 of elastic seal edge 30 to rotate counter clockwise from the position illustrated in FIG. 3. By elastically compressing and elastically extruding rounded edge 32 in the direction of angled vector 35, this pressure will urge rounded edge 32 into tighter contact with stainless steel seat surface 20. In fact, for leakage to occur, rounded edge 32 of elastic seal edge 30 will have to rotate past stainless steel seat surface 20. Presuming that sufficient elastic compression and elastic extrusion has occurred, such motion will not occur.

Having described elastic seal edge 30 in detail, its complimentary clamp C will be set forth with respect to FIG. 4.

First, clamp C includes seal expansion limiting surface 40. This prevents elastic seal edge 30 from elastically expanding and elastically extruding to and toward the central portion of valve disc F. The only elastic expansion and elastic extrusion that is permitted of elastic seal edge 30 is to and toward the edge of valve disc F.

Second, clamp C is provided with through bolt B. This through stud B is concentric of high pressure surface side 36 and causes uniform elastic compression and elastic extrusion of rounded edge 32 of elastic seal edge 30 along angled vector 35. If this were not located concentrically of elastic seal edge 30, elastic compression and elastic extrusion would not occur with uniformity; the desired sealing effect would be lost.

Third, clamp C will be observed to have necked down portion 44 mating to beveled section 33. This section of clamp C is vital in providing the desired elastic compression and elastic extrusion of rounded edge 32 toward stainless steel seat surface 20.

Figure 5:
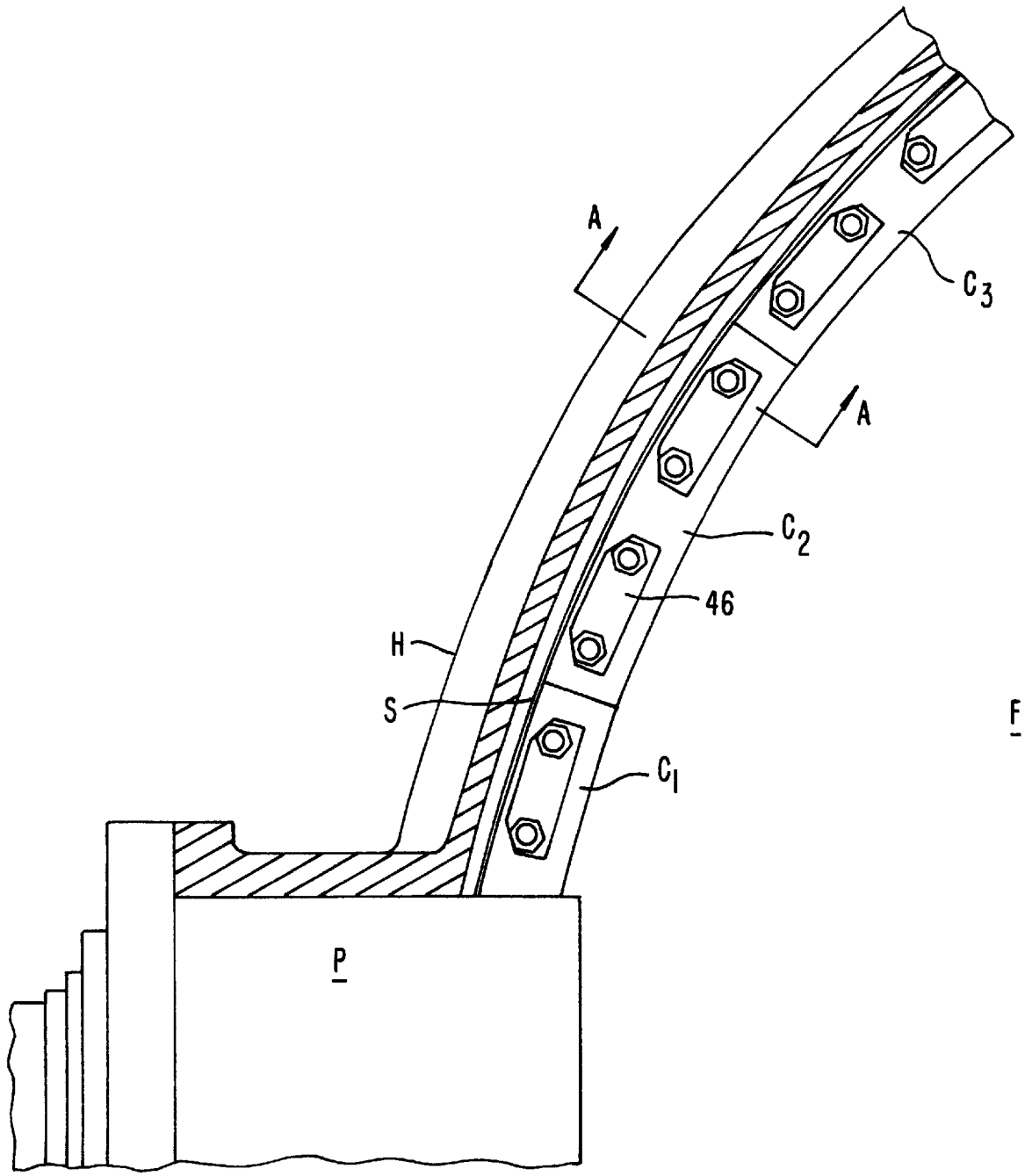

Fourth, and referring to FIG. 5, clamp sections C1, C2, and C3 can all be seen. These respective clamp sections occupy segments of the total periphery of valve flap F. Additionally, and to prevent rotation of through stud B, stainless lock strips 46 are bent upward to lock the nuts of the through studs in place, once tightening has occurred.

Having set forth the total parameters of elastic seal edge 30 and clamp C, operation can now be described. Presuming that complete replacement with stainless steel seat surface 20 and elastic seal edge 30 has occurred, valve disc F is moved to the closed position. Thereafter, tightening of through studs B occurs until rounded edge 32 elastically compresses and elastically extrudes along angled vector 35 into contact with stainless steel seat surface 20. This is usually done visually.

Thereafter, hydraulic pressure is introduced to high pressure surface side 36 of elastic seal edge 30 and valve disc F itself. Further compression of through bolts B occurs until leakage ceases or is maintained at an acceptable rate.

Finally, stainless lock strips 46 are bent upward to prevent through stud and nut B rotation and the repair is complete.

The reader will understand that the shape of elastic seal edge 30 at rounded edge 32 is some what counter intuitive. Even through high pressure is encountered—and one would normally want elastic seal edge 30 to be thicker where the high pressure is encountered at stainless steel seat surface 20, I have found that "necking down" of elastic seal edge 30 is required at this point. Further, I have observed that elastic seal edge 30 at rounded edge 32 both elastically compresses and elastically extrudes under the action of clamp C. Thus, rounded edge 32 as it advances along angled vector 35 is both hard and compressed so that its interaction with stainless steel seat surface 20 is sufficient to resist the hydraulic pressure encountered.

What is claimed is:

1. A process of providing a new valve seal for butterfly valves for pressures between 150 psi and 600 psi comprising the steps of:

provide a butterfly valve having a valve housing with a seat, the seat being oriented with respect to the valve housing to surround a passage within the valve housing, the passage permitting fluid flow through the butterfly valve and the seat;

providing a valve disc pivotally moving across the valve housing with respect to the seat from an open position wherein the valve disc is parallel to the fluid flow through the valve housing to a closed position wherein the valve disc is normal to the fluid flow and obstructs fluid flow through registry at a valve seal edge to a seat, providing the valve seal edge with an elastic edge for forming the new valve seal, the elastic edge tapering from a relatively broad cross-section adjacent the valve seal edge to a narrow cross-section away from the valve seal edge;

providing an annulus on the valve disc to prevent elastic extrusion of the elastic edge away from the valve seal edge of the valve disc;

providing a clamp overlying the valve seal edge beyond the annulus of the valve disc for compressing and extruding the elastic edge, the clamp necking from a relatively broad cross-section adjacent a medial portion of the elastic edge to a narrow cross-section adjacent a periphery of the valve seal edge of the valve disc; and, compressing and extruding the clamp over the elastic edge to cause elastic compression and extrusion of the elastic edge toward the valve seat whereby a compressed and, extruded portion of the narrow cross-section of the elastic edge protrudes from the valve disc edge into contact with the seat to provide the new valve seal.

2. A process of providing a new valve seal according to claim 1 and wherein the step of providing the elastic edge of the valve seal includes:

providing the elastic edge from hard rubber with a hardness in the range of 70±5 Shore.

3. A process of providing a new valve seal according to claim 1 and further including:

placing the clamp adjacent a medial portion of the elastic edge shaped for extrusion of the elastic edge along an axis at an obtuse angle with respect to the upstream side of the valve seat;

compressing the clamp on the elastic edge to cause elastic compression and extrusion of the elastic edge at an obtuse angle toward the valve seat; and applying hydrostatic pressure onto the valve seat in the closed disposition whereby a compressed and extruded portion of the elastic edge protrudes from the valve disc edge into contact with the seat along the obtuse angle and pressure from the upstream side of the valve seat urges the compressed and extruded portion of the elastic edge to move from the obtuse angle to and toward a normal with the valve seat.

4. A process of providing a new valve seal according to claim 1 and further including:

providing the elastic edge of the valve seal includes providing the elastic edge from hard rubber with a hardness in the range of 70±5 Shore.

5. A process of providing a new valve seal for butterfly valves for pressures between 150 psi and 600 psi comprising the steps of:

providing a butterfly valve having a valve housing with a seat, the seat being oriented with respect to the valve housing to surround a passage within the valve housing, the passage permitting fluid flow through the butterfly valve and the seat;

providing a valve disc pivotally moving across the valve housing with respect to the seat from an open position wherein the valve disc is parallel to the fluid flow through the valve housing to a closed position wherein the valve disc is normal to the fluid flow and obstructs fluid flow through registry at a valve seal edge to a seat, providing the valve seal edge with an elastic edge for forming the new valve seal the elastic edge tapering from a relatively broad cross-section adjacent the valve seal edge to a narrow cross-section away from the valve seal edge;

providing an annulus on the valve flap to prevent elastic extrusion of the elastic edge away from the valve seal edge of the valve disc;

providing a clamp overlying the valve disc edge beyond the annulus of the valve seal for compressing and extruding the elastic edge, the clamp adjacent a medial portion of the elastic edge shaped for extrusion of the elastic edge along an axis at an obtuse angle with respect to the upstream side of the valve seat;

compressing the clamp on the elastic edge to cause elastic compression and extrusion of the elastic edge at an obtuse angle toward the valve seat; and applying hydrostatic pressure across the valve seat to cause a compressed and extruded portion of the elastic edge protruding from the valve disc edge into contact with the seat along the obtuse angle and pressure from the upstream side of the valve seat urges the compressed and extruded portion of the elastic edge to move from the obtuse angle to and toward a normal with the valve seat.

6. In the combination of a butterfly valve for pressures between 150 psi and 600 psi according to claim 4 and further comprising:

providing a clamp overlying the valve seal edge beyond the annulus of the valve disc for compressing and extruding the elastic edge, the clamp necking from a relatively broad cross-section adjacent a medial portion of the elastic edge to a narrow cross-section adjacent a periphery of the valve seal edge of the valve disc;

compressing and extruding the clamp over the elastic edge to cause elastic compression and extrusion of the elastic edge toward the valve seat whereby a compressed and extruded portion of the narrow cross-section of the elastic edge protrudes from the valve disc edge into contact with the seat to provide the new valve seal.

* * * * *